(12) United States Patent  (10) Patent No.:  US 12,465,135 B1
Hu  (45) Date of Patent:  Nov. 11, 2025

(54) OZONE DISINFECTION BOTTLE OR CUP

(71) Applicant: Jiaquan Hu, Hunan (CN)

(72) Inventor: Zhenggen Hu, Hunan (CN)

(73) Assignee: Jia Quan Hu, Hunan (CN)

( * ) Notice: Subject to any disclaimer, the term of this patent is extended or adjusted under 35 U.S.C. 154(b) by 0 days.

(21) Appl. No.: 19/202,624

(22) Filed: May 8, 2025

(30) Foreign Application Priority Data

Mar. 28, 2025 (CN) .......................... 202520582016.1

(51) Int. Cl.
    *A61L 2/20* (2006.01)
    *A45F 3/18* (2006.01)
    (Continued)

(52) U.S. Cl.
    CPC ................ *A45F 3/18* (2013.01); *A61L 2/202* (2013.01); *B65D 23/12* (2013.01); *B65D 47/066* (2013.01); *C01B 13/10* (2013.01); *C02F 1/50* (2013.01); *A45F 2003/003* (2013.01); *A61L 2101/02* (2020.08); *A61L 2202/11* (2013.01); *A61L 2202/121* (2013.01); *A61L 2202/122* (2013.01); *A61L 2202/123* (2013.01); *A61L 2202/14* (2013.01); *A61L 2202/16* (2013.01); *C02F 2201/004* (2013.01); *C02F 2201/005* (2013.01);
    (Continued)

(58) Field of Classification Search
    CPC ...... A45F 3/18; A45F 2003/003; A61L 2/202; A61L 2101/02; A61L 2202/11; A61L 2202/121; A61L 2202/122; A61L 2202/123; A61L 2202/14; A61L 2202/16; A61L 2/183; A61L 2/02; A61L 2202/15; A61L 2202/24; A61L 2/24; A61L 2/22; A61L 2/035; A61L 9/12; B65D 23/12; B65D 47/066; C01B 13/10; C01B 13/115; C01B 2201/62; C01B 2201/22; C01B 2201/10; C02F 1/50; C02F 2201/004; C02F 2201/005; C02F 2201/782; C02F 2303/04; C02F 2307/02; C02F 1/461; C02F 2201/46165; C02F 2201/46125; C02F 1/46109; C02F 1/4674; C02F 1/78; C02F 2201/4615; C02F 1/36; C02F 2209/44; C02F 2209/005; C02F 2201/4618; C02F 2209/006; C02F 1/46104; C02F 9/20; C02F 2001/46152; C02F 2201/46155; C02F 2307/06; C02F 2001/46157; C02F 2001/46119; C02F 1/4672; Y02E 60/36; Y02W 10/37; Y02A 20/208; C25B 9/00; C25B 1/13; B08B 3/026; H02M 7/53838; H02J 2207/20

See application file for complete search history.

(56) References Cited

U.S. PATENT DOCUMENTS 5,960,742 A   10/1999  O'Rourke et al.
2005/0284745 A1* 12/2005  Smith ............... H02M 7/53838
                                         204/176

(Continued)

*Primary Examiner* — Xiuyu Tai

(57) ABSTRACT

The embodiments of the application disclose an ozone disinfection bottle or cup, including a cup body, the cup body comprising a cavity provided with a first opening; an ozone generator, the ozone generator being arranged in the cavity; and a circuit board and a battery, the ozone generator and the battery being electrically connected to the circuit board; wherein, the ozone generator is able to generate ozone and disinfect liquid in the cavity by means of the generated ozone.

12 Claims, 12 Drawing Sheets

(51) Int. Cl.
*B65D 23/12* (2006.01)
*B65D 47/06* (2006.01)
*C01B 13/10* (2006.01)
*C02F 1/50* (2023.01)
*A45F 3/00* (2006.01)
*A61L 101/02* (2006.01)

(52) U.S. Cl.
CPC .... *C02F 2201/782* (2013.01); *C02F 2303/04* (2013.01); *C02F 2307/02* (2013.01)

(56) References Cited

U.S. PATENT DOCUMENTS

| | | | |
|---|---|---|---|
| 2006/0157343 A1* | 7/2006 | Herrington | C02F 1/4674 204/232 |
| 2008/0087224 A1 | 4/2008 | Wechsler | |
| 2009/0114605 A1* | 5/2009 | Salama | C25B 9/00 210/748.19 |
| 2019/0216052 A1 | 7/2019 | Yang | |
| 2021/0068367 A1 | 3/2021 | Gong et al. | |

* cited by examiner

OZONE DISINFECTION BOTTLE OR CUP

CROSS REFERENCE TO RELATED APPLICATIONS

This application claims priority benefits to Chinese Patent Application No. 2025205820161, filed on Mar. 28, 2025, the contents of which are incorporated herein by reference.

TECHNICAL FIELD

The embodiments of the application relate to an ozone disinfection bottle or cup.

BACKGROUND

Although the quality of drinking water is being improved continuously, the environment where the drinking water is transported, delivered and stored is not sterile, and particularly after the drinking water is drunk repeatedly, more malignant bacteria will be bred in the water, leading to a decline in the water quality.

SUMMARY

The embodiments of the application provide an ozone disinfection bottle or cup to solve at least one technical problem in the prior art.

An ozone disinfection bottle or cup includes:
a cup body, including a cavity provided with a first opening;
an ozone generator, arranged in the cavity; and
a circuit and a battery, the ozone generator and the battery being electrically connected to the circuit board;
wherein, the ozone generator is able to generate ozone and disinfect liquid in the cavity by means of the generated ozone.

In one scheme, a detachable base plate is arranged at the bottom of the cup body, and the detachable base plate simplifies the manufacturing process of the cup body and reduces the manufacturing cost. In one scheme, the base plate of the cup body is provided with a heating element configured for heating liquid in the cup body or keeping the liquid warm. In one scheme, the ozone disinfection bottle or cup in the application is provided with a base, a circuit and a battery for operation of the ozone generator are arranged in the base, and the ozone generator is selectively controlled to operate. In one scheme, an indicator light is arranged on the base and configured for displaying an operating state of electronic elements connected to the circuit. In one scheme, the cup body in the application is provided with a cup lid, a water trough and a water outlet are formed in the cup lid, and water in the cup body may flow into the water trough via the water outlet to be drunk by pets. The water trough is mounted on the cup body to be carried easily, and when pets drink water, the cup may be held by hand to prevent the water trough from being overturned by the pets.

BRIEF DESCRIPTION OF THE DRAWINGS

Accompanying drawings constituting one part of the application are used to provide a further understanding of the application. Illustrative embodiments of the application and descriptions thereof are merely used to explain the application and should not be construed as improper limitations of the application. Wherein.

Figure 1:
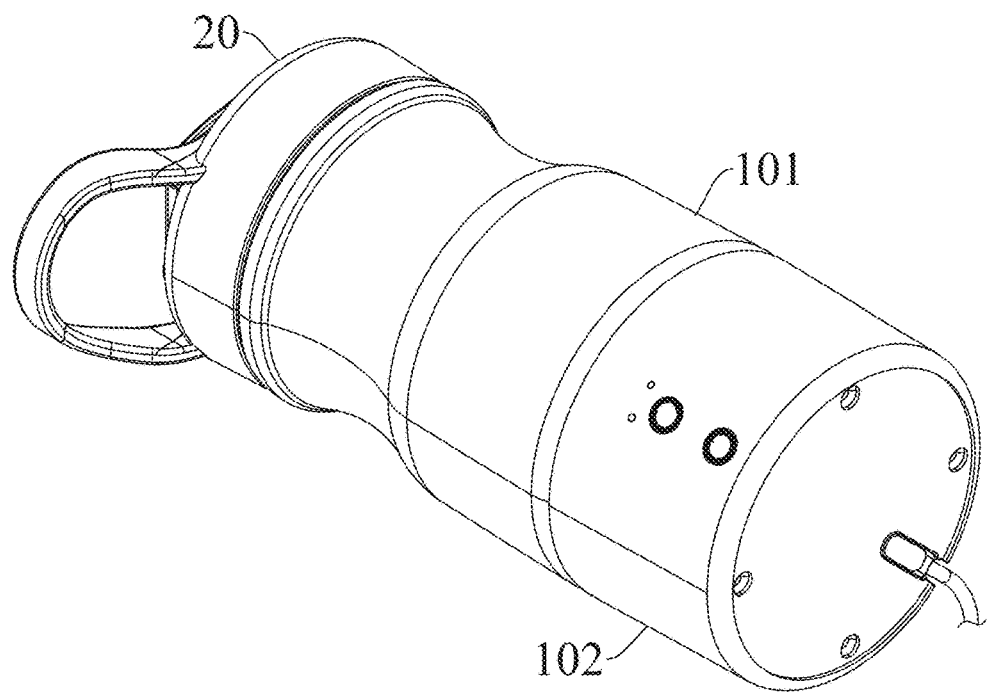
FIG. 1 is a schematic structural diagram of an ozone disinfection cup according to one embodiment of the application.

Reference numerals: 101, cup body; 1011, cavity; 1012, first opening; 1013, second opening; 1014, raised rim; 102, base; 1021, chamber; 103, base plate; 1031, first connecting column; 104, connecting frame; 1041, connecting plate; 1042, groove; 1043, second connecting column; 105, light hole; 106, touch region; 107, light guide member; 1071, stationary plate; 108, sealing gasket; 109, sealing ring; 20, cup lid; 201, water outlet; 202, lid; 21, cup lid; 211, lid body; 2111, inner cavity; 2112, passage; 2113, water outlet; 2114, blind hole; 212, filter plate; 2121, filter hole; 213, valve body; 2131, sealing element; 2132, assembly hole; 2133, guide hole; 214, valve rod; 2141, drive rod; 2141, press portion; 2143, limit protrusion; 2144, spring; 301, circuit board; 302, battery; 303, ozone generator; 304, heating piece; 305, key; 306, indicator; 3071, power socket; 3072, power plug; 41, first water trough; 411, first side plate; 412, second side plate; 4121, notch; 413, rotating shaft; 414, suspension lug; 42, second water trough.

DETAILED DESCRIPTION OF THE EMBODIMENTS

The application is described in detail below with reference to accompanying drawings and embodiments. Examples are provided for explaining the application rather than limiting the application. Actually, it is obvious for those skilled in the art that modifications and transformations may be made to the application without departing from the scope or spirit of the application. For example, part of features illustrated or described as one embodiment may be applied to another embodiment to produce a different embodiment. Therefore, the application intends to include all such modifications and transformations falling within the range of the appended claims and their equivalents.

In the description of the application, terms such as "longitudinal," "transverse," "upper," "lower," "front," "back," "left," "right," "vertical," "horizontal," "top" and "bottom" are used to indicate directional or positional relations based on the accompanying drawings merely for the purpose of facilitating the description of the application, do not require that the application must be configured and operated in a specific direction, and thus should not be construed as limitations of the application. The terms "link," "connect" and "arrange" should be understood in a broad sense. For example, "connect" may refer to fixed connection or detachable connection; direct connection, indirect connection by means of an intermediate component; wired electrical connection, wireless electrical connection or wireless communication signal connection. Those ordinarily skilled in the art may appreciate the specific meaning of these terms according to specific circumstances.

One or more examples of the application are illustrated in the accompanying drawings. Numeric or alphabetic reference signs are used in the detailed description to represent features in the accompanying drawings. Identical or similar reference signs in the accompanying drawings and description are used to represent identical or similar parts of the application. As used here, terms such as "first," "second" and "third" may be used interchangeably to distinguish one component from another component and are not intended to indicate the position or importance of an individual component.

Figure 2:
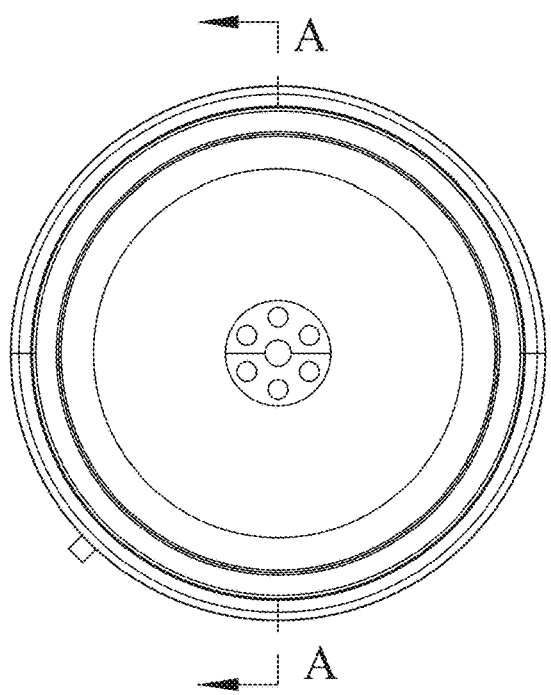
FIG. 2 is a schematic diagram of a cup body from one perspective according to one embodiment of the application.
Figure 3:
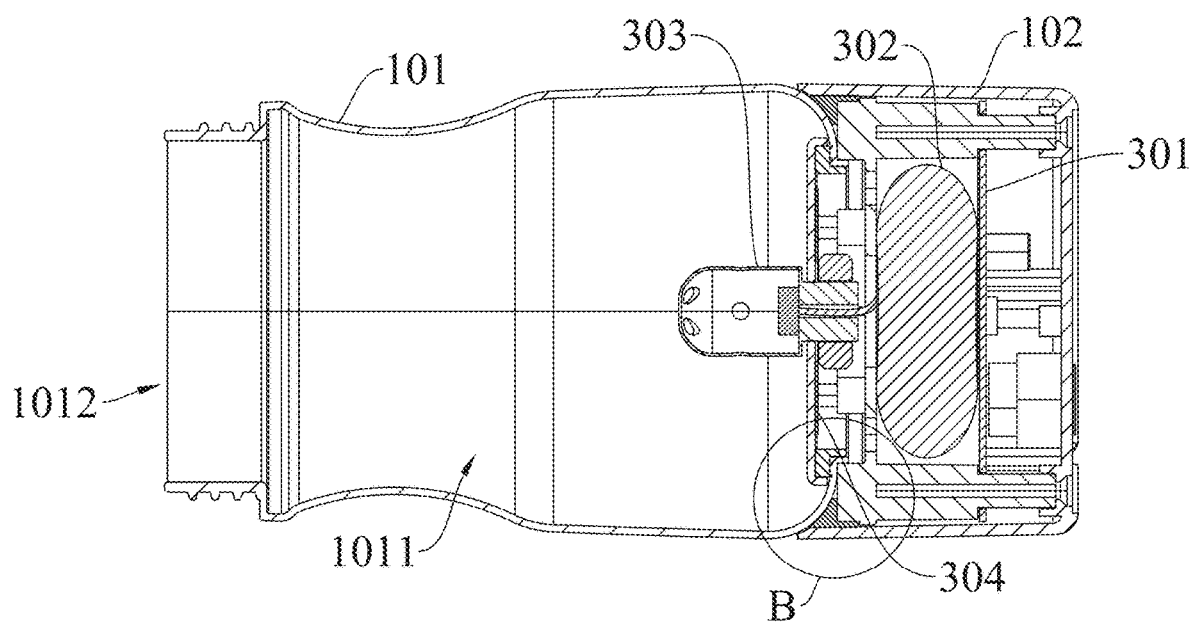
FIG. 3 is a sectional view in an AA direction in FIG. 2.

As shown in FIGS. 1-3, one embodiment of the application provides an ozone disinfection bottle or cup. In this embodiment of the application, with an ozone disinfection cup as an example, the ozone disinfection cup includes a cup body 101 and a base 102. In some embodiments, the cup body 101 is mounted above the base 102. The cup body 101 includes a cavity 1011 provided with a first opening 1012, and an ozone generator 303 is mounted at the bottom of the cavity 1011. The ozone generator 303 is able to generate ozone in the cavity 1011, and the ozone generated by the ozone generator 303 is configured for improving the water quality in the cavity 1011. The base 102 is provided with a chamber 1021, a circuit board 301 and a battery 302 are arranged in the chamber 1021, a control circuit is arranged on the circuit board 301, and the ozone generator 303 and the battery 302 are electrically connected to the circuit board 301.

As shown in FIGS. 3-6, in some embodiments, the cup body 101 is detachably mounted above the base 102. Wherein, a connecting frame 104 is arranged at the bottom of the cup body 101, and a first side of the connecting frame 104 is fixedly mounted at the bottom of the cup body 101. The chamber 1021 of the base 102 is provided with an opening 1022, and a second side of the connecting frame 104 is able to extend into the chamber 1021 via the opening 1022 and is connected to the bottom of the chamber 1021. In the process of connecting the connecting frame 104 and the base 102, the opening 1022 of the chamber 1021 gradually comes close to an outer wall of the cup body 101 and abuts against the outer wall to seal the base 102, such that liquid is prevented from entering the chamber 1021, which may otherwise damage electronic elements in the chamber 1021.

Figure 4:
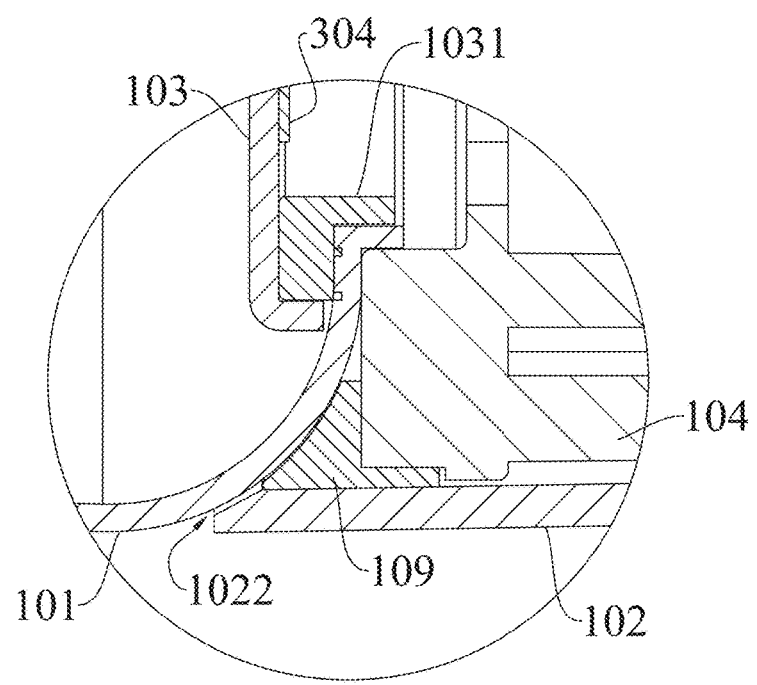
FIG. 4 is an enlarged view of part B in FIG. 3.
Figure 5:
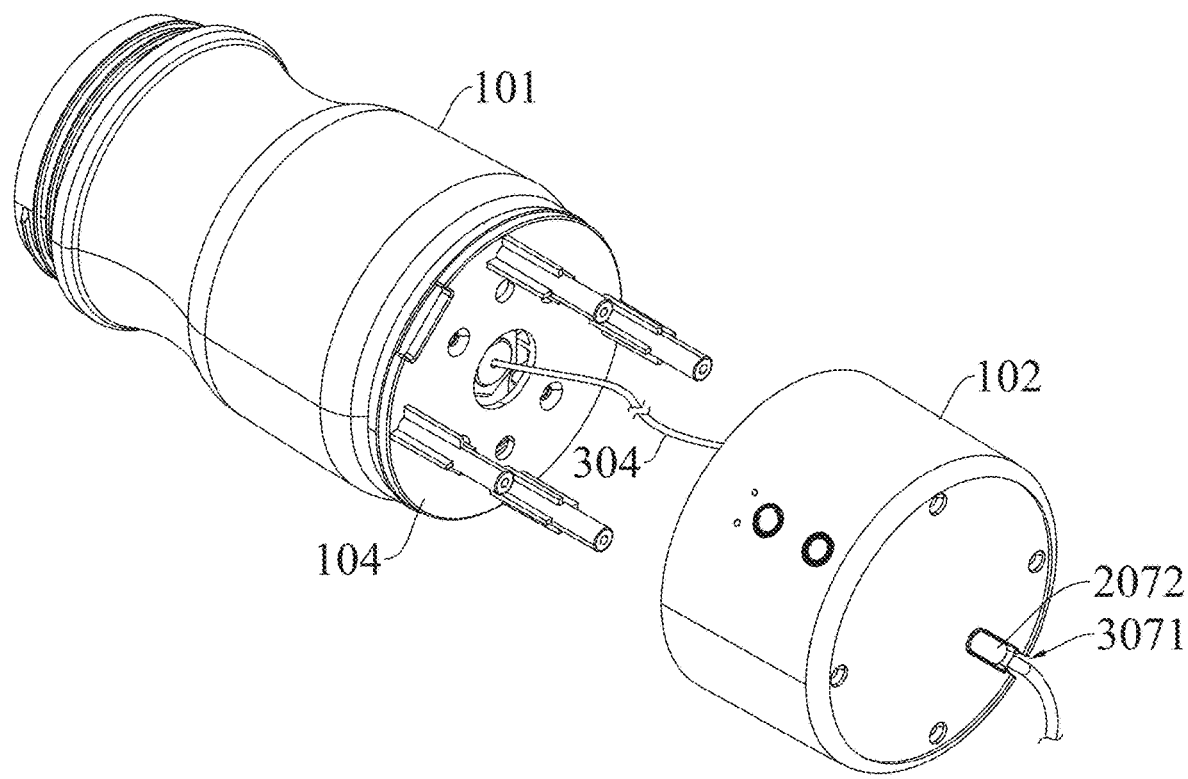
FIG. 5 is a schematic diagram in a state where the cup body and a base are separated according to one embodiment of the application.

As shown in FIGS. 4 and 5, in some embodiments, a sealing ring 109 is arranged between the cup body 101 and the connecting frame 104. After the cup body 101 and the base 102 are connected, the sealing ring 109 is closely attached to the cup body 101 and an inner wall of the opening 1022 of the chamber 1021 to fulfil a better sealing effect.

Figure 6:
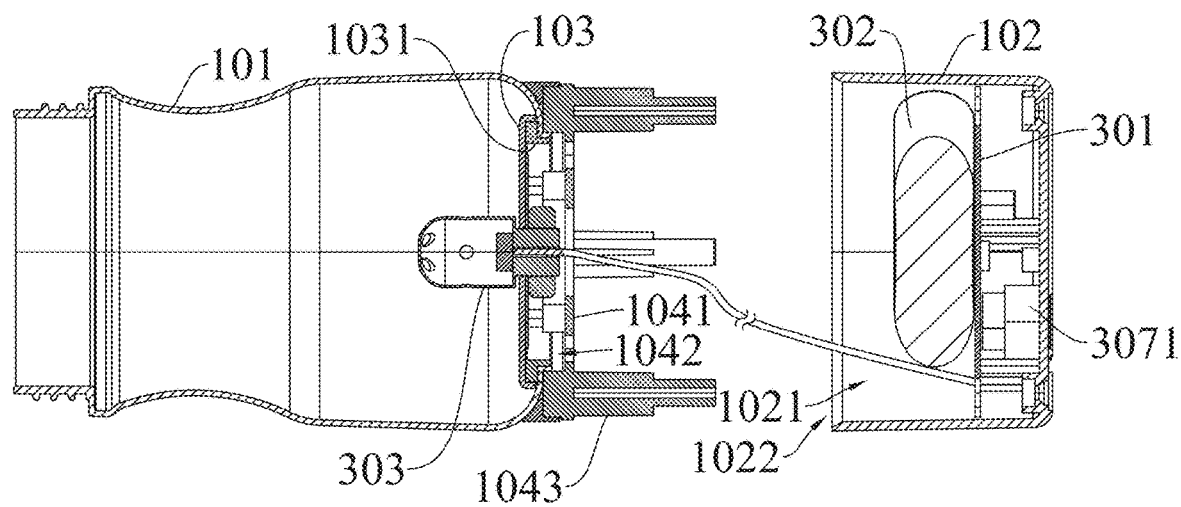
FIG. 6 is a sectional view in one direction of FIG. 5.
Figure 7:
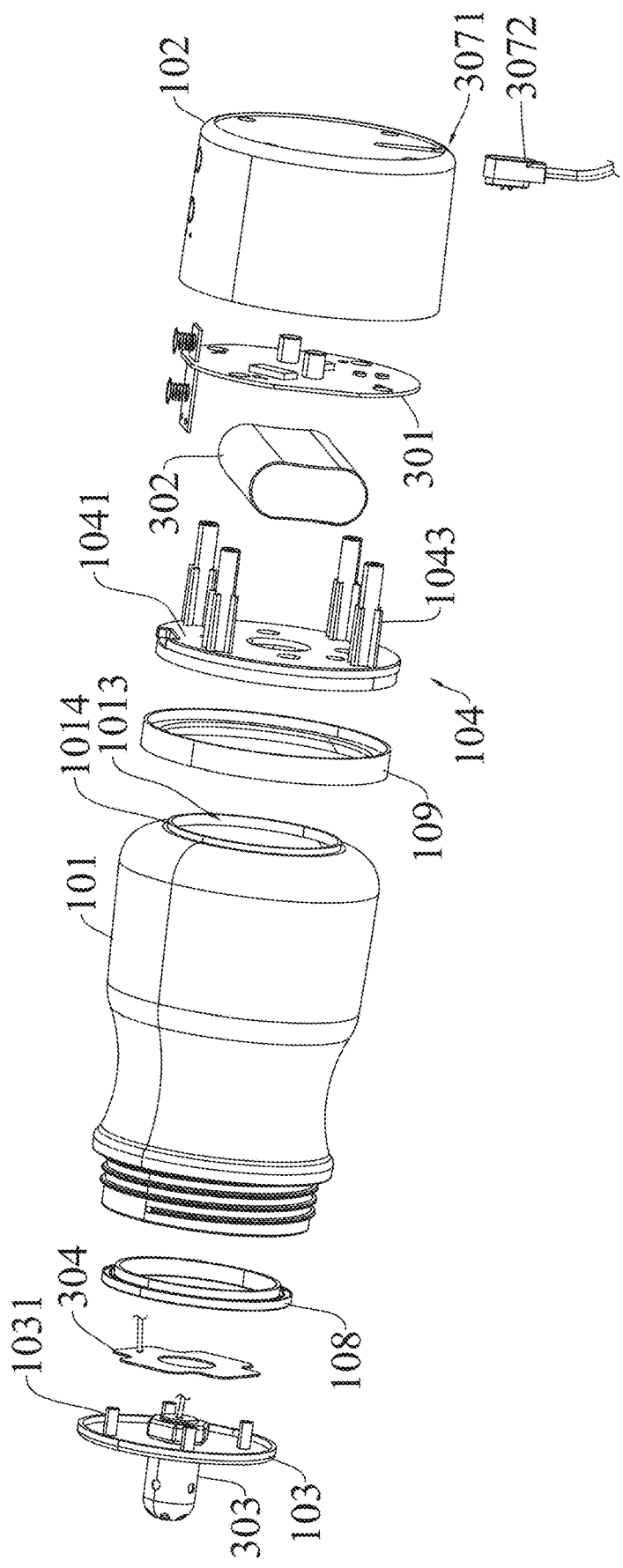
FIG. 7 is a schematic exploded view of one structure of the cup body and the base according to one embodiment of the application.

As shown in FIGS. 7, 5 and 6, in some embodiments, the bottom of the cavity 1011 is formed by a base plate 103, and the base plate 103 is detachably connected to the cup body 101. Wherein, the cup body 101 is provided with a second opening 1013, the base plate 103 is arranged on a side of the second opening 1013 facing the inside of the cavity 1011, and the connecting frame 104 is arranged on a side of the second opening 1013 facing away from the cavity 1011. The base plate 103 is firmly connected to the connecting frame 104 and seals the second opening 1013, such that the cavity for containing liquid is defined by the cup body 101 and the base plate 103. In this embodiment, the base plate 103 and the cup body 101 are configured as separate structures and may be machined separately, such that the difficulty of the machining process is lowered, and assembly and circuit arrangement between the base plate 103 and the cup body 101 are facilitated.

Figure 8:
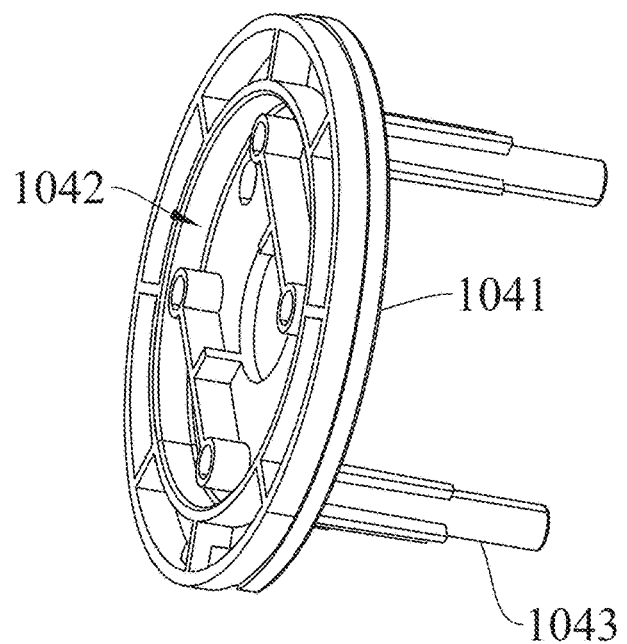
FIG. 8 is a schematic diagram of a connecting frame according to one embodiment of the application.

As shown in FIGS. 7 and 8, in some embodiments, the connecting frame 104 includes a connecting plate 1041. A plurality of first connecting columns 1031 are arranged on a side of the base plate 103 facing the connecting frame 104, and the first connecting columns 1031 extend through the second opening 1013 to be connected to the connecting plate 1041. Wherein, in some embodiments, the connecting plate 1041 has a first side surface facing the second opening 1013 of the cavity 1011, a groove 1042 extending inwards is formed in the first side surface, and a raised rim 1014 extending outwards is arranged on an edge of the second opening 1013 of the cup body 101. Referring to FIG. 6, during assembly, the raised rim 1014 of the cup body 101 is embedded in the groove 1042 of the connecting plate 1041 to fulfil the purpose of limiting. The raised rim 1014 may be in clearance or interference fit with the groove 1042, which is not specifically limited here.

In some embodiments, the connecting plate 1041 is provided with a plurality of second connecting columns 1043, and the plurality of second connecting columns 1043 are located on a side of the connecting plate 1041 facing the base 102. Ends of the second connecting columns 1043 are able to extend into the chamber 1021 via the opening of the base 102 and are connected to the bottom of the chamber 1021, such that the base 102 and the cup body 101 are firmly connected.

As shown in FIGS. 4-7, in some embodiments, a circular sealing gasket 108 is arranged at the second opening 1013 and located between the base plate 103 and the second opening 1013. The base plate 103 may better seal the second opening 1013 by means of the sealing gasket 108.

As shown in FIGS. 3, 4 and 7, in some embodiments, the base plate 103 is provided with a heating element. In this embodiment, the heating element is a heating piece, and the heating piece is attached to a side, facing the second opening 1013, of the base plate 103 and electrically connected to the circuit board 301.

Figure 9:
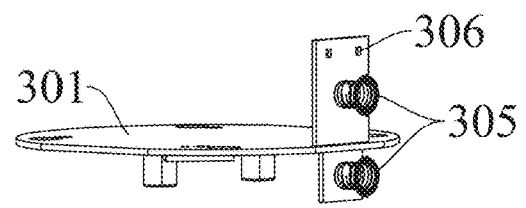
FIG. 9 is a schematic exploded view of the base and a circuit board according to one embodiment of the application.
Figure 9:
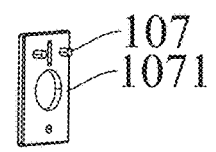
Figure 9:
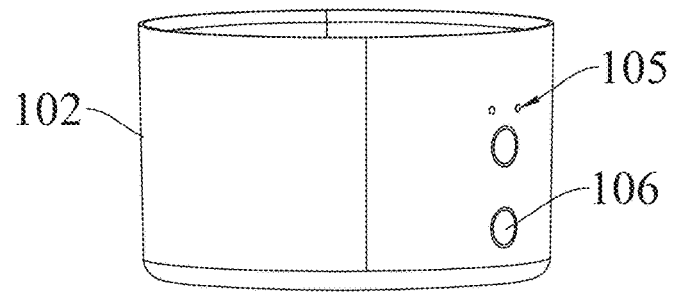

In some embodiments, a key is arranged on the base 102, and the key is electrically connected to the circuit board 301 and configured for controlling the operating state of the ozone generator 303 or/and the heating element. As shown in FIGS. 7 and 9, in this embodiment, touch keys 305 are arranged on the circuit board 301, and touch regions 106 corresponding to the keys 305 are arranged on an outer side of the base 102. The keys 305 are arranged in the chamber 1021 of the base 102, and induction coils of the touch keys 305 are close to the touch regions 106 and are able to acquire the touch condition of the touch regions 106. Optionally, one or more keys 305 may be provided, and the operating state of the ozone generator 303 or/and the heating element may be controlled according to the number of touches of the key 305 or by touching different keys 305.

In some embodiments, indicator lights 306 are arranged on the base 102 and configured for indicating the operating state of the ozone generator 303 and the heating element, and the indicator lights 306 are electrically connected to the circuit board 301. In some embodiments, the base 102 is provided with light holes 105, and the indicator lights 305 are mounted in the light holes 105. In this embodiment, light guide members 107 are arranged in the light holes 105, and the indicator lights 306 are arranged in the chamber 1021 and transmit light by means of the light guide members 107. In addition, different information may be conveyed by means of colors of the light guide members 107. Wherein, the light guide members 107 may be made from materials with light transmitting performance such as glass, resin and gel. In addition, in this application, the light guide members 107 are mounted on a stationary plate 1071, and the stationary plate 1071 is connected to an inner wall of the base 102.

In some embodiments, as shown in FIGS. 5-7, a power interface is arranged on the base 102 and connected to the circuit board 301, and the power interface may be electrically connected to a power adapter. In this embodiment, a power socket 3071 is arranged at the bottom of the base 102 and electrically connected to the circuit board 301. A power plug 3072 of the power adapter is selectively combined with and electrically connected to the power socket 3071. The power socket 3071 and the power plug 3072 may be connected by magnetic attraction. Universal plugs and sockets, such as USB interfaces and circular power interfaces, may be adopted.

In some embodiments, as show in FIG. 1, a cup lid arranged at the first opening 1012 of the cup body 101. Different types of cup lids may be selected according to different application scenarios.

Figure 10:
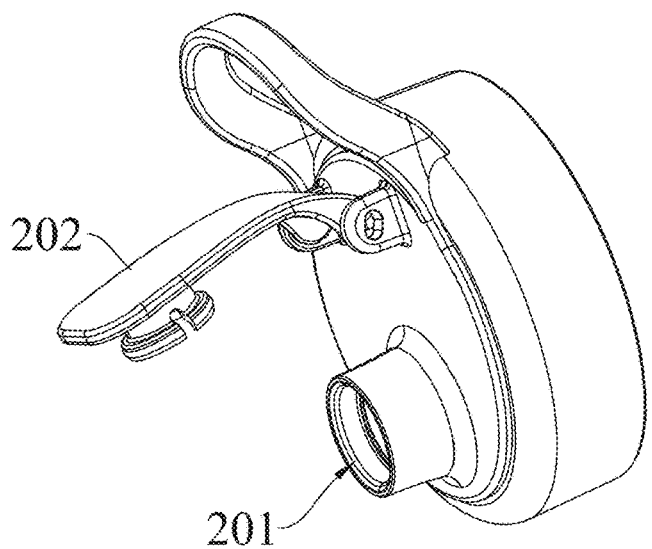
FIG. 10 is a schematic diagram of a cup lid according to one embodiment of the application.

In some embodiments, as shown in FIG. 10 which illustrates a common cup lid 20, users may drink water by means of the cup with the cup lid 20, and the cup lid 20 is provided with a water outlet 201 and a lid 202 configured for selectively covering the water outlet 201. The cup lid 20 and the cup body 101 are threadedly connected.

Figure 11:
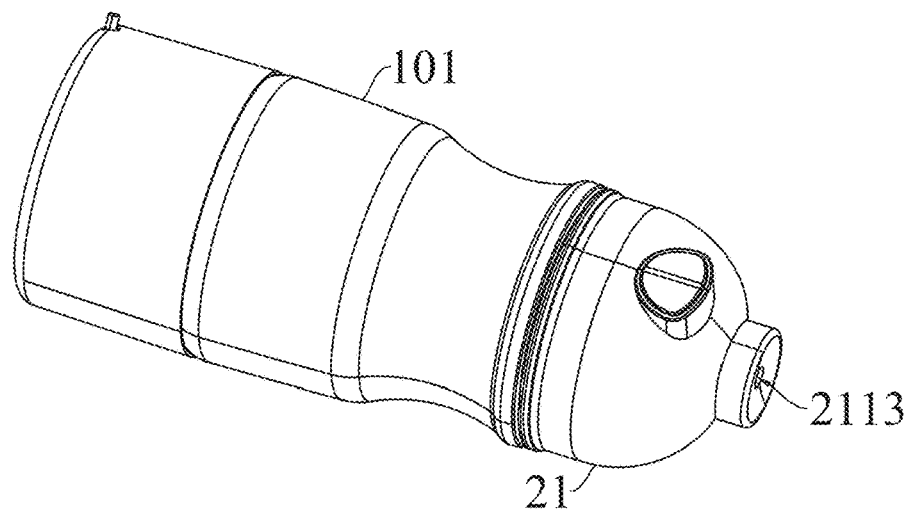
FIG. 11 is a schematic diagram of the ozone disinfection cup provided with another cup lid according to one embodiment of the invention.
Figure 12:
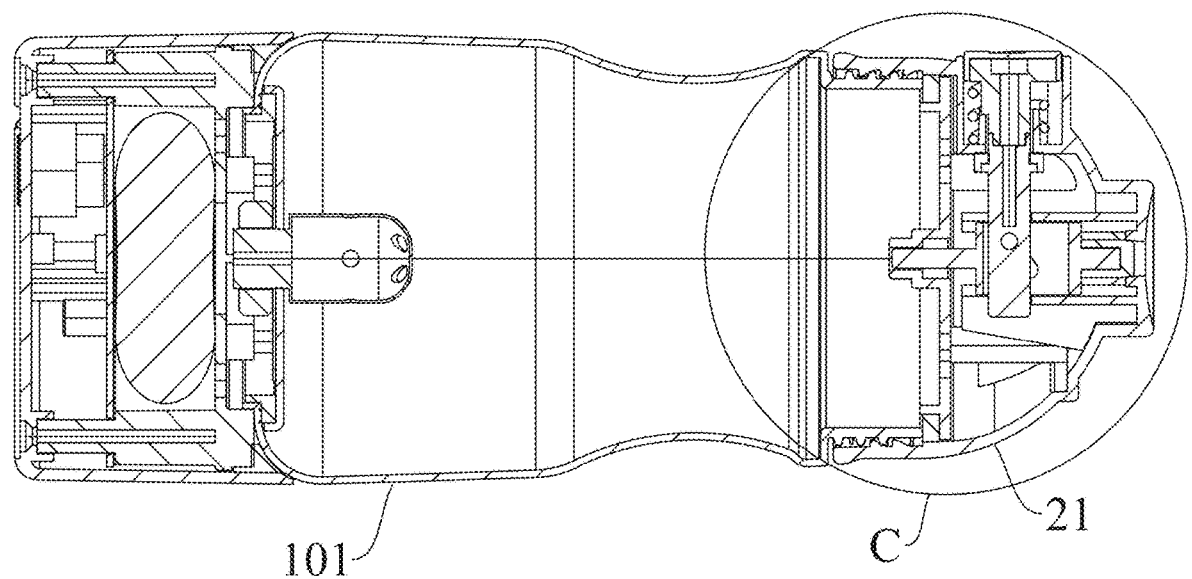
FIG. 12 is a sectional view in one direction of FIG. 11.
Figure 12A:
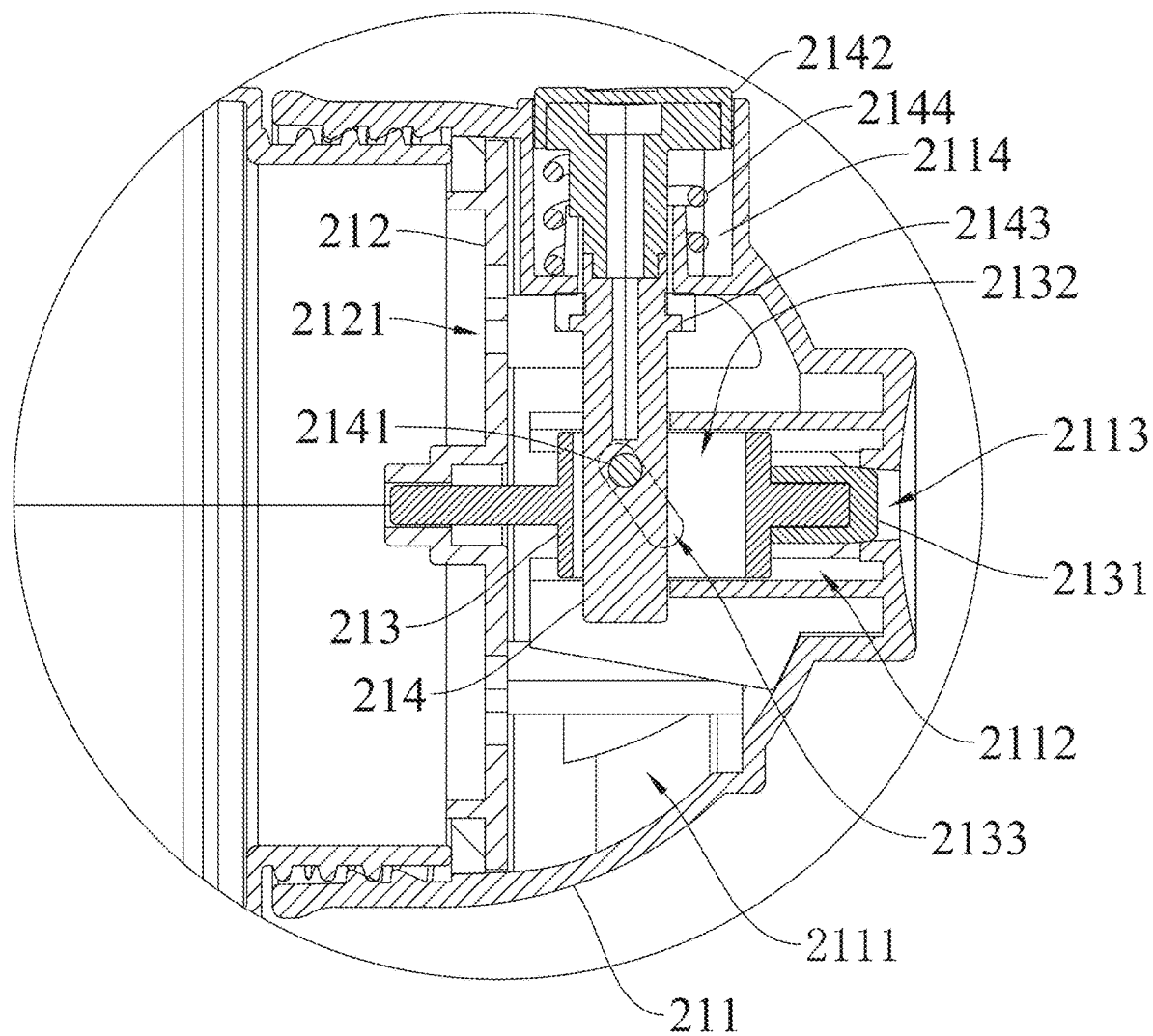
FIG. 12A is an enlarged view of part C in FIG. 12.
Figure 12B:
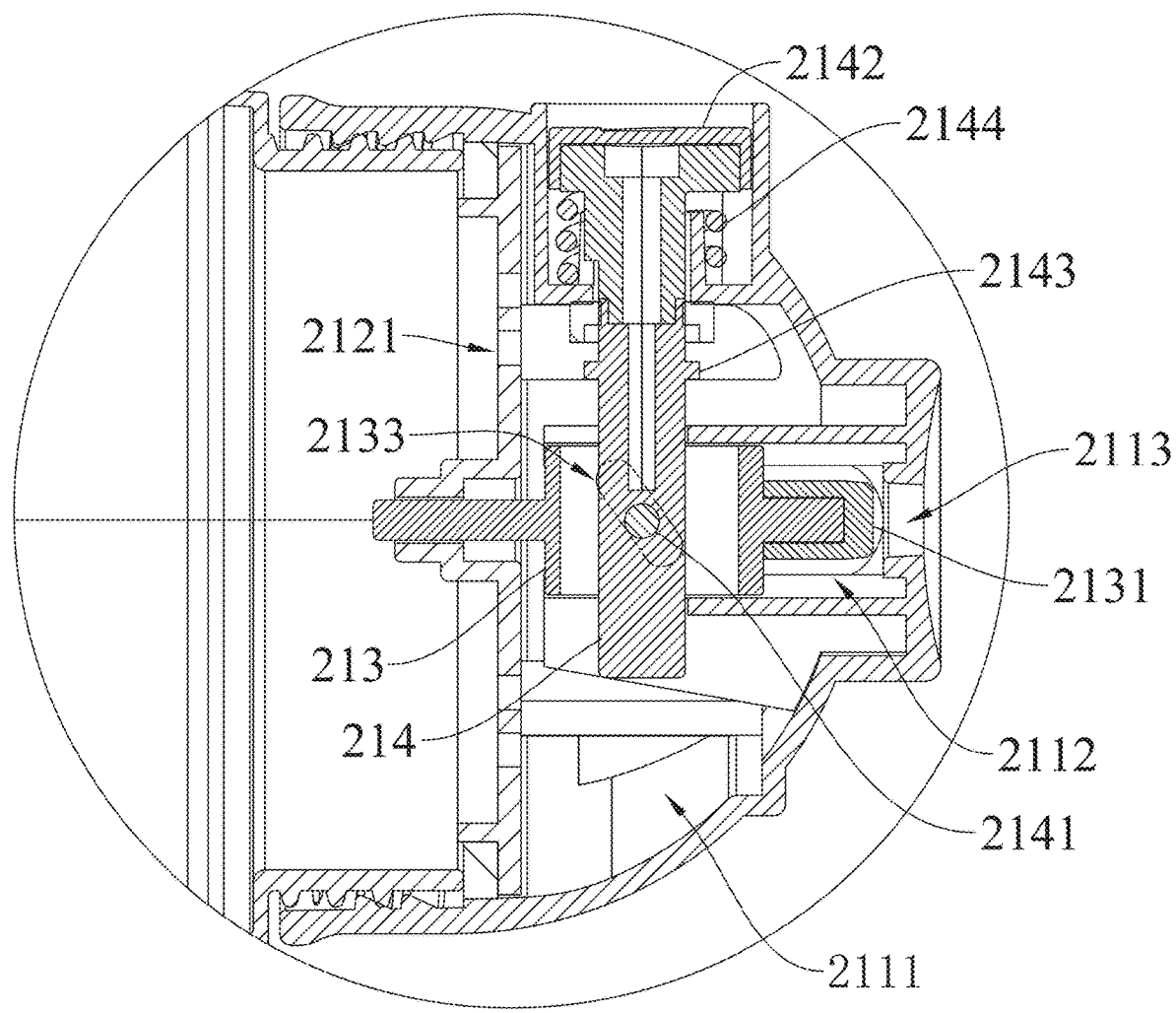
FIG. 12B is another schematic state diagram of a water control valve in FIG. 12A.

In some embodiments, as shown in FIGS. 11-12B which illustrate a cup lid 21 provided with a water control valve, the cup lid 21 has the advantage of being able to control the water outlet state by means of the valve and is applicable to various occasions. The cup lid 21 includes a lid body 211, the lid body 211 is provided with an inner cavity 2111 for guiding a water flow, a water outlet 2113 is formed in one end of the lid body 211, and the water outlet 2113 is connected to the inner cavity 2111. The inner cavity 2111 is provided with a passage 2112, one end of the passage 2112 is connected to the water outlet 2113, and the other end of the passage 2112 is connected to the inner cavity 2111. A valve body 213 is arranged in the passage 2112 and is slidable in the passage 2112. A sealing element 2131 is arranged at an end, facing the water outlet 2113, of the valve body 213, and when sliding in the valve body 213, the sealing element 2131 selectively seals the water outlet 2113. A strip-shaped guide hole 2133 is formed in the valve body 213, and an included angle between a length direction of the guide hole 2113 and a sliding direction of the valve body 213 is an acute angle. A blind hole 2114 is formed in the cup lid 21, and an axial direction of the blind hole 2114 is perpendicular to the sliding direction of the valve body 213. A limit hole is formed in the bottom of the blind hole 2114, and a valve rod 214 is inserted into the limit hole and intersects with the valve body 213. A drive rod 2141 is perpendicularly arranged on the valve rod 214, and at least part of the drive rod 2141 extends into the guide hole 2133 in the valve body 213. The valve rod 214 selectively moves in an axial direction of the blind hole 2114, and the drive rod 2141 and the guide hole 2133 work together to drive the valve body 213 to move to thereby selectively seal the water outlet 2113 in the lid body 211 by means of the sealing element 2131 on the valve body 213. In this embodiment, a limit protrusion 2143 is arranged on the valve rod 214 and configured for limiting a maximum moving distance of the valve rod 214 towards an outer side of the lid body 211. A press portion 2142 is arranged at the top of the valve rod 214, a spring 2144 is arranged in the blind hole 2114, the spring 2144 is disposed around the valve rod 214, one end of the spring 2144 abuts against the bottom of the blind hole 2114, and the other end of the spring 2144 abuts against the press portion 2142, such that the spring 2144 is limited in the blind hole 2114. As shown in FIG. 12A, the valve rod 214 is pushed by the elastic force of the spring 2144 to move upwards to a preset position, and at the same time, the valve rod 214 drives the valve body 213 to move rightwards and seal the water outlet 2113. As shown in FIG. 12B, the valve rod 214 is pressed downwards, and at the same time, the valve rod 214 drives the valve body 213 to move leftwards to thereby separate the sealing element 2131 of the valve body 213 from the water outlet 2113. At this moment, liquid in the cup body 101 flows out from the inner cavity 2111 via the passage 2112 and the water outlet 2113.

Figure 13:
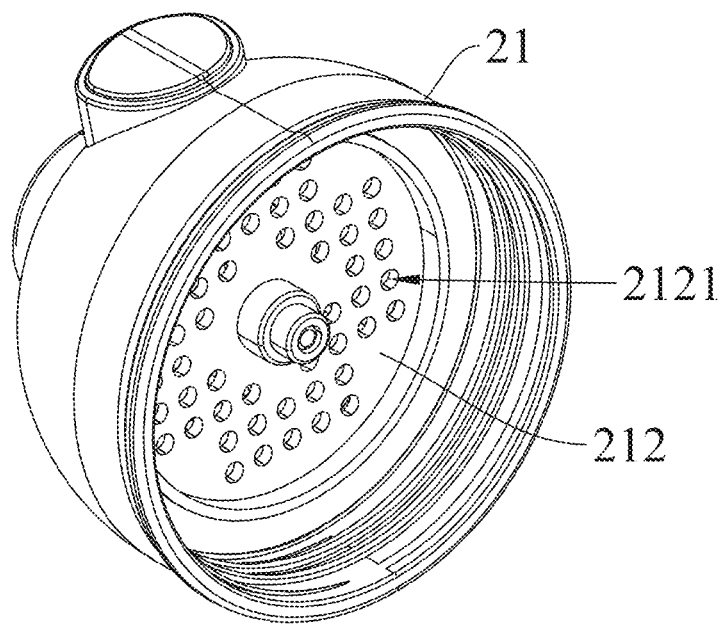
FIG. 13 is a schematic diagram of the cup lid in FIG. 11 from another perspective.

As shown in FIG. 13, in some embodiments, the cup lid 21 is provided with a filter plate 212, a plurality of filter holes 2121 are formed in the filter plate 212, an edge of the filter plate 212 is connected to an inner wall of the lid body 211, and the valve body 213 and the valve rod 214 are limited between the filter plate 212 and the water outlet 2113. In some embodiments, the filter plate 212 is provided with a through-hole, a guide rod is arranged on the valve body 213, the guide rod is arranged opposite to the sealing element 2131 in the sliding direction of the valve body 213, and the guide rod is slidable in the through-hole of the filter plate 212. The guide rod and the through-hole work together to further limit a movement trajectory of the valve body 213.

In some embodiments, the ozone disinfection cup provided with the cup lid 21 may be applied to pets.

Figure 14:
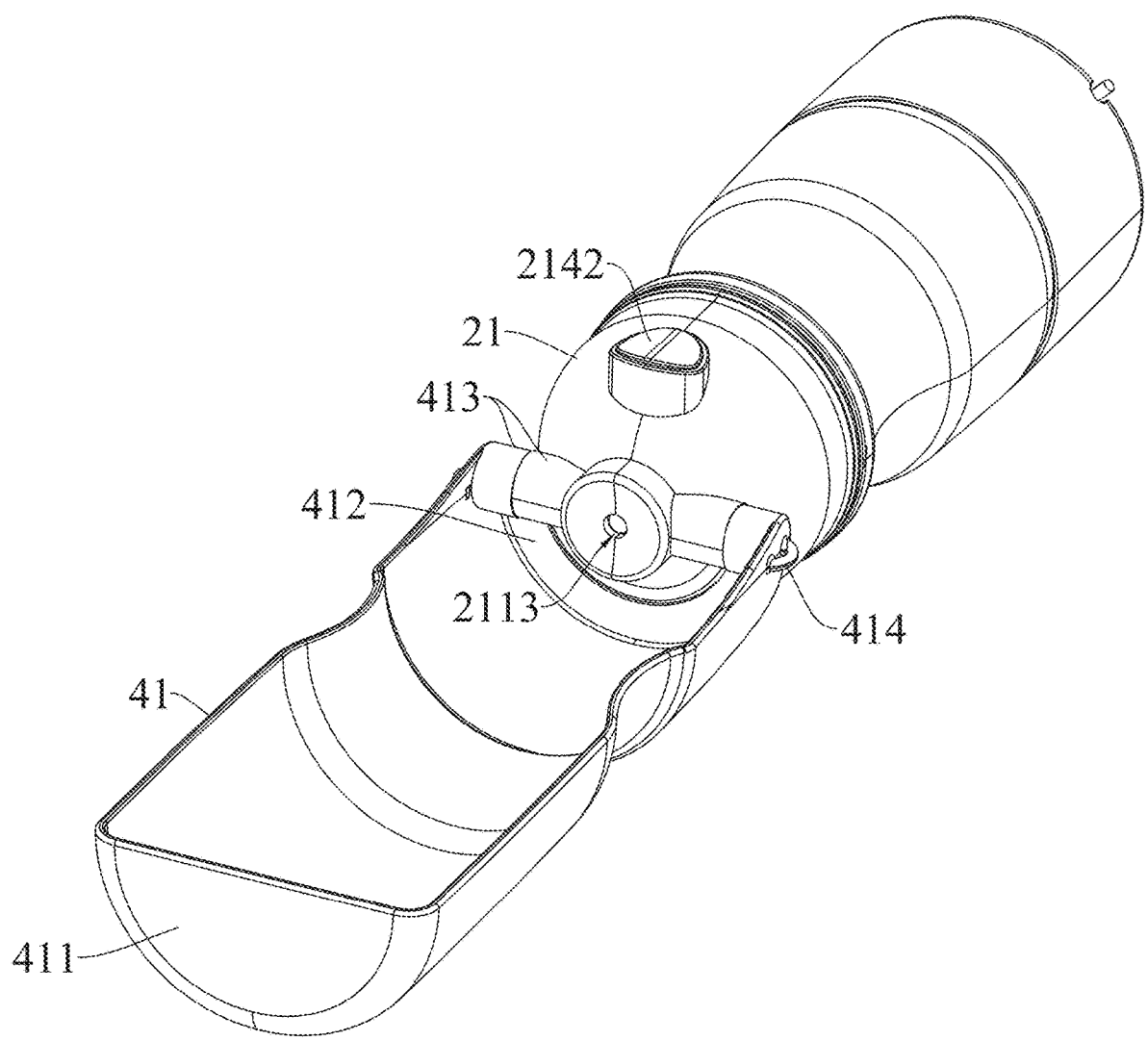
FIG. 14 is a schematic diagram of the ozone disinfection cup provided with a first water trough according to one embodiment of the application.
Figure 15:
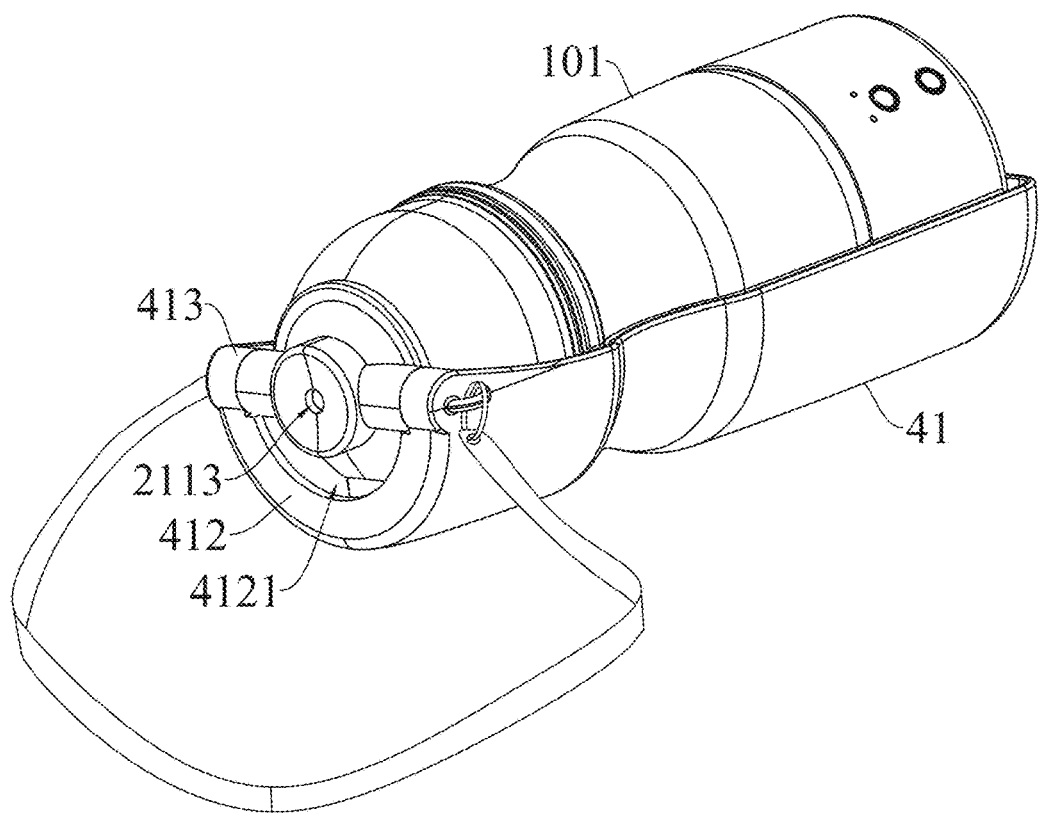
FIG. 15 is another schematic state diagram of FIG. 14.

As shown in FIGS. 14 and 15, in one embodiment, the cup lid 21 is provided with a rotatable first water trough 41, a first end of the first water trough 41 is provided with a first side plate 411, a second end of the first water trough 41 is provided with a second side plate 412, and the second end of the first water trough 41 is rotatably connected to the cup lid 21 by means of a rotating shaft 413. The ozone disinfection cup is selectively received in the first water trough 41 to be carried easily. Or, the first water trough 41 is selectively unfolded, then the water control valve is triggered to open the water outlet 2113, and water in the cup body 101 is poured into the first water trough 41 to be drunk by pets.

In some embodiments, the second side plate 412 is provided with a notch 4121, and the notch 4121 may receive at least part of the lid body 211, such that when the first water trough 41 is unfolded, the water outlet 2113 of the cup lid 21 may extend into the first water trough 41 to prevent water from flowing out of the first water trough 41 along a gap between the water outlet 2113 and the second side plate 412 when the water is poured.

In some embodiments, as shown in FIG. 14, the press portion 2142 of the water control valve is arranged on a side surface of the cup lid 21. When the first water trough 41 is rotated and the ozone disinfection bottle is received in the first water trough 41, the press portion 2142 is hidden in the first water trough 41, such that that the situation where water flows out of the cup body 101 due to mistouch of the water control valve, resulting in unpredicted trouble is prevented.

Figure 16:
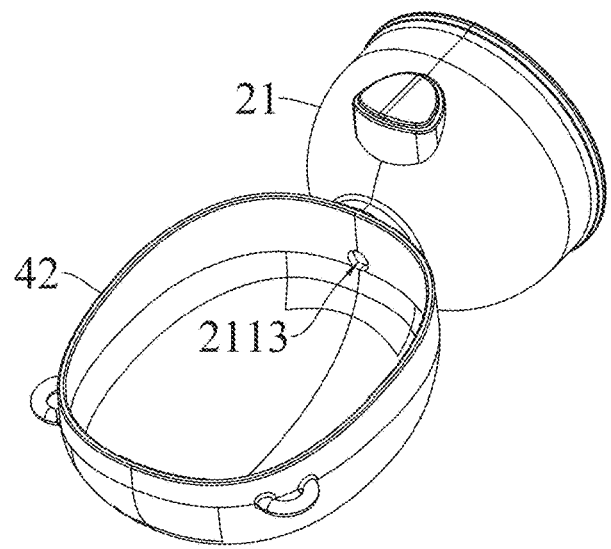
FIG. 16 is a schematic structural diagram of a second water trough according to one embodiment of the application.

As shown in FIG. 16, in another embodiment, the cup lid 21 is provided with a second water trough 42, the second water trough 42 is fixedly mounted on an outer side of the water outlet 2113, and the water outlet 2113 is connected to the second water trough 42.

In addition, in some embodiments, suspension lugs 414 are arranged on outer walls of the first water trough 41 and the second water trough 42. The suspension lugs 414 may be connected to a sling to allow users to carry the cup easily.

Some embodiments of the application are described above, but these embodiments are not intended to limit the application. For those skilled in the art, the application may have various modifications and transformations. Any amendments, equivalent substitutions and improvements made based on the spirit and principle of the application should all fall within the protection scope of the application.

What is claimed is:

1. An ozone disinfection bottle or cup, comprising:
   a cup body comprising a cavity provided with a first opening;
   an ozone generator arranged in the cavity; and
   a circuit board and a battery, the ozone generator and the battery being electrically connected to the circuit board;
   wherein the ozone generator is able to generate ozone and the ozone generated from the ozone generator is able to disinfect liquid in the cavity;
   a second opening is formed in a bottom of the cup body, a base plate is arranged in the cup body, the ozone generator is arranged on the base plate, the base plate is able to selectively seal the second opening to form the cavity with the cup body, a base is arranged on an outer side of the cup body, the base is provided with a chamber, and the circuit board and the battery are arranged in the chamber;
   a connecting frame is arranged at a second end of the cup body, the base plate and the connecting frame are respectively arranged on inner and outer sides of the second opening and are detachably connected, and a side of the connecting frame facing away from the cup body is connected to the base;
   the connecting frame comprises a connecting plate, a plurality of first connecting columns are arranged on a side of the base plate facing the connecting frame, and the plurality of first connecting columns extend through the second opening to be connected to the connecting plate;
   a groove extending inwards is formed in a side of the connecting plate facing the cup body, a raised rim extending outwards is arranged on an edge of the second opening of the cup body, and the raised rim is selectively embedded in the groove to limit relative positions of the cup body and the connecting plate.

2. The ozone disinfection bottle or cup according to claim 1, wherein
   a plurality of second connecting columns are arranged on a side of the connecting frame facing the base, the base is provided with a third opening communicated with the chamber, and ends of the plurality of second connecting columns extend into the chamber via the third opening and are detachably connected to a bottom of the chamber;
   wherein an edge of the third opening abuts against an outer wall of the cup body to seal the third opening.

3. The ozone disinfection bottle or cup according to claim 1, wherein
   a sealing gasket is arranged between the base plate and the second opening.

4. The ozone disinfection bottle or cup according to claim 1, wherein
   the base plate is provided with a heating element, and the heating element is electrically connected to the circuit board.

5. The ozone disinfection bottle or cup according to claim 1, wherein
   a key is arranged on the base, and the key is electrically connected to the circuit board.

6. The ozone disinfection bottle or cup according to claim 1, wherein
   an indicator light is arranged on the base, and the indicator light is electrically connected to the circuit board and configured for displaying an operating state of electronic elements connected to the circuit board.

7. The ozone disinfection bottle or cup according to claim 1, wherein
   a power interface is arranged on the base, and the power interface is electrically connected to the circuit board and is optionally electrically connected to a power adapter.

8. An ozone disinfection bottle or cup comprising:
   a cup body comprising a cavity provided with a first opening;
   an ozone generator arranged in the cavity;
   a circuit board and a battery, the ozone generator and the battery being electrically connected to the circuit board;
   wherein the ozone generator is able to generate ozone and the ozone generated from the ozone generator is able to disinfect liquid in the cavity;
   wherein a second opening is formed in a bottom of the cup body, a base plate is arranged in the cup body, the ozone generator is arranged on the base plate, the base plate is able to selectively seal the second opening to form the cavity with the cup body, a base is arranged on an outer side of the cup body, the base is provided with a chamber, and the circuit board and the battery are arranged in the chamber;
   a connecting frame is arranged at a second end of the cup body, the base plate and the connecting frame are respectively arranged on inner and outer sides of the second opening and are detachably connected, and a side of the connecting frame facing away from the cup body is connected to the base;
   a plurality of second connecting columns are arranged on a side of the connecting frame facing the base, the base is provided with a third opening communicated with the chamber, and ends of the plurality of second connecting columns extend into the chamber via the third opening and are detachably connected to a bottom of the chamber, and an edge of the third opening abuts against an outer wall of the cup body to seal the third opening; and
   a sealing ring arranged between the cup body and the connecting frame, wherein when the cup body is fixedly connected to the base, the sealing ring is closely attached to the outer wall of the cup body and an inner wall of the third opening to seal the third opening.

9. An ozone disinfection bottle or cup, comprising:

a cup body comprising a cavity provided with a first opening;

an ozone generator arranged in the cavity; and a circuit board and a battery, the ozone generator and the battery being electrically connected to the circuit board;

wherein the ozone generator is able to generate ozone and the ozone generated from the ozone generator is able to disinfect liquid in the cavity;

a cup lid is arranged at the first opening of the cup body, the cup lid is provided with a water outlet and a water control valve, the water control valve comprises a valve body, the valve body selectively seals the water outlet, and a water trough is formed in the cup lid;

the valve body is selectively detached from the water outlet to allow liquid in the cup body to flow out via the water outlet, and the water trough is configured for containing the liquid flowing out via the water outlet.

10. The ozone disinfection bottle or cup according to claim 9, wherein the water trough is rotatably connected to the cup lid;

the ozone disinfection bottle or cup has:

a folded state where the water trough is selectively rotated and at least part of the ozone disinfection bottle or cup is received in the water trough; and a water containing state where the water trough is selectively unfolded and contains the liquid flowing out via the water outlet.

11. The ozone disinfection bottle or cup according to claim 10, wherein two sides of a first end of the water trough are hinged to the cup lid, the water trough has a first side wall arranged at the first end of the water trough, a notch is formed in the first side wall, and the notch is able to receive a part of the cup lid; when the ozone disinfection bottle or cup is in the water containing state, the water outlet is located between the first end and a second end of the water trough.

12. The ozone disinfection bottle or cup according to claim 10, wherein the water control valve further comprises a drive rod, the drive rod is configured for driving the valve body to seal/be detached from the water outlet, a press portion of the drive rod is located on a side surface of the cup lid, and when the ozone disinfection bottle or cup is in the folded state, the press portion is hidden in the water trough.

* * * * *